(12) United States Patent
Schwarz et al.

(10) Patent No.: US 8,973,607 B2
(45) Date of Patent: Mar. 10, 2015

(54) FAILSAFE AIR VALVE ARRANGEMENT

(75) Inventors: Josef Schwarz, Worms (DE); Juergen Schneider, Worms (DE)

(73) Assignee: Röchling Automotive SE & Co. KG, Mannheim (DE)

(*) Notice: Subject to any disclaimer, the term of this patent is extended or adjusted under 35 U.S.C. 154(b) by 221 days.

(21) Appl. No.: 13/537,447

(22) Filed: Jun. 29, 2012

(65) Prior Publication Data

US 2013/0001454 A1  Jan. 3, 2013

(30) Foreign Application Priority Data

Jun. 30, 2011 (DE) .......................... 10 2011 078 461

(51) Int. Cl.
*F16K 1/24* (2006.01)
*B60K 11/08* (2006.01)

(52) U.S. Cl.
CPC ................................... *B60K 11/085* (2013.01)
USPC ................. 137/601.08; 251/129.11; 251/212; 251/313; 180/68.1; 454/319

(58) Field of Classification Search
CPC ...... B60K 11/085; F16K 1/165; F16K 31/043
USPC ............. 251/129.11, 212; 180/68.1; 454/319; 137/601.05, 601.08
See application file for complete search history.

(56) References Cited

U.S. PATENT DOCUMENTS

| | | | |
|---|---|---|---|
| 2,174,358 A * | 9/1939 | Blumenthal .................... | 165/98 |
| 2,884,005 A * | 4/1959 | Honerkamp et al. .... | 137/601.04 |
| 4,534,506 A * | 8/1985 | Ishida et al. ................. | 236/35.3 |
| 4,723,481 A * | 2/1988 | Hart et al. ...................... | 454/369 |
| 4,753,288 A * | 6/1988 | Harvey ........................... | 165/98 |
| 5,096,156 A * | 3/1992 | Wylie et al. ..................... | 251/77 |
| 8,136,487 B2 * | 3/2012 | Bernt et al. ................. | 123/41.05 |
| 8,161,919 B2 * | 4/2012 | Klotz et al. ................. | 123/41.04 |

FOREIGN PATENT DOCUMENTS

| | | |
|---|---|---|
| DE | 20 2008 002 433 U1 | 7/2008 |
| DE | 102008061054 A1 | 6/2010 |
| DE | 102009035362 A1 | 2/2011 |
| DE | 102011100582 A1 | 12/2011 |
| EP | 3701584 A1 | 8/1988 |
| EP | 2371602 A1 | 10/2011 |

* cited by examiner

*Primary Examiner* — Matthew W Jellett

(74) *Attorney, Agent, or Firm* — Rothwell, Figg, Ernst & Manbeck, P.C.

(57) ABSTRACT

An air valve arrangement for a motor vehicle, comprising a frame and an air valve provided on said frame so as to be rotatable thereto about an axis of relative movement (R) in opposing directions of relative rotation, the frame comprising an air passage opening, and the air valve is provided in such a way on the frame that it is rotatable between a shut-off position and a passage position, the air valve in the passage position reducing a passage opening area of the air passage opening less than in the shut-off position, and further comprising a drive, which is designed to drive the air valve in at least one first direction of relative rotation about the axis of relative movement (R) for relative rotation, characterized in that the air valve is coupled to a preloading device, which preloads the air valve in a direction of relative rotation.

17 Claims, 2 Drawing Sheets

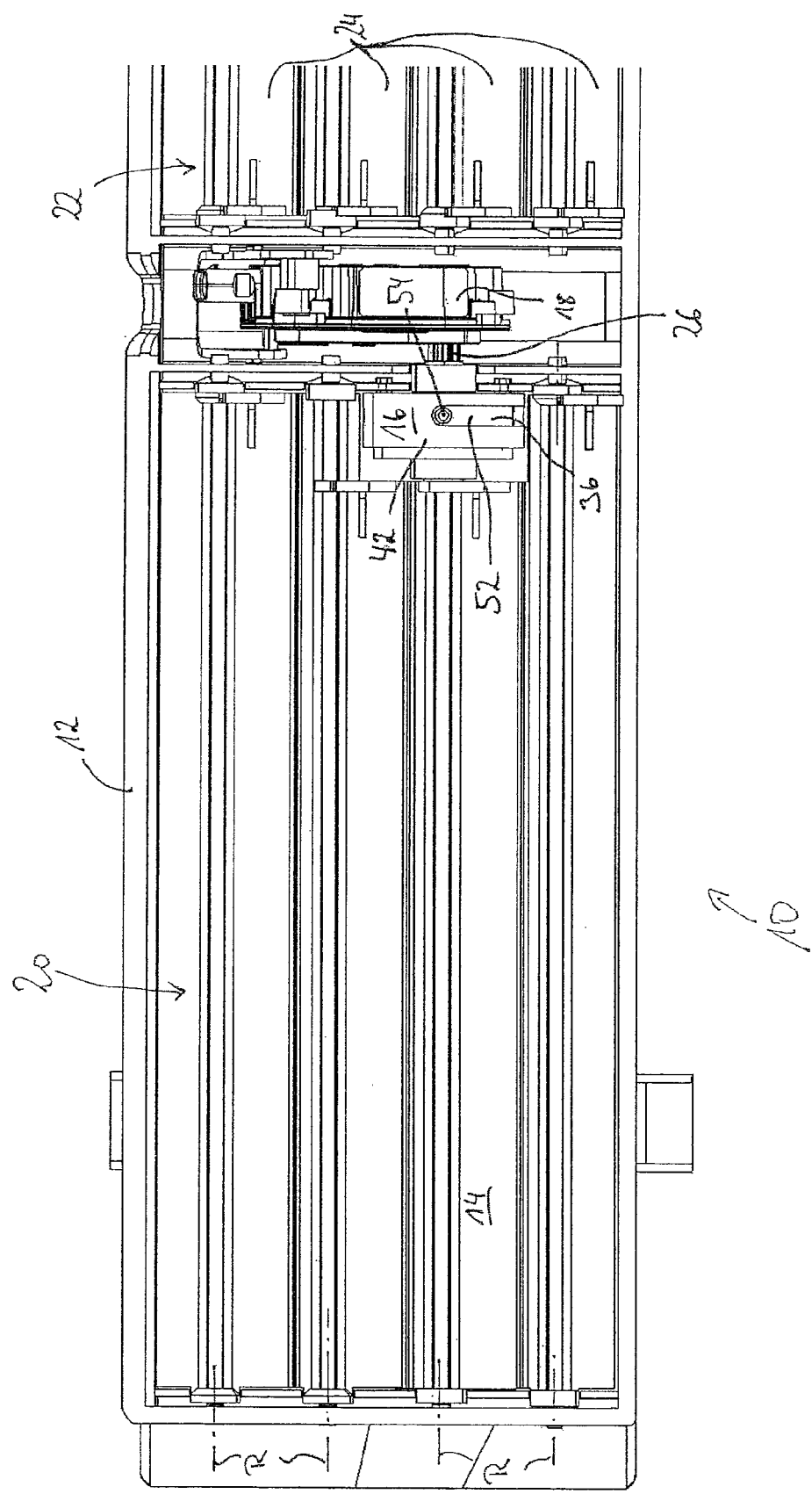

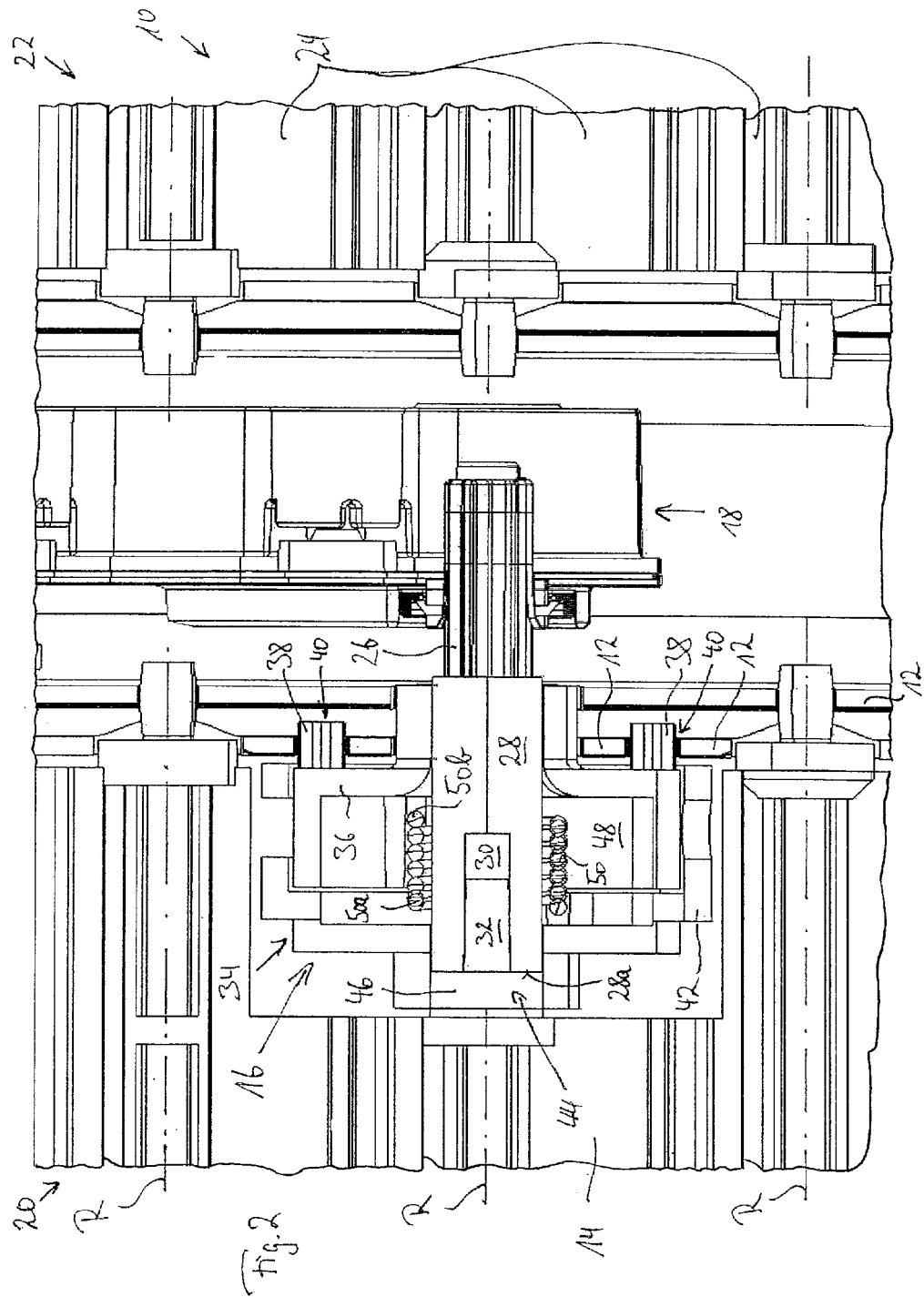

FAILSAFE AIR VALVE ARRANGEMENT

The present invention relates to an air valve arrangement for a motor vehicle, comprising a frame, and an air valve provided on the frame so as to be rotatable relative thereto in opposite directions of relative rotation about an axis of relative movement, the frame comprising an air passage opening, and the air valve being provided in such a way on the frame that it may be rotated between a shut-off position and a passage position, the air valve reducing a passage opening area of the air passage opening less in the passage position than in the shut-off position, and further comprising a drive, which is designed to drive the air valve to perform relative rotation in at least one first direction of relative rotation about the axis of relative movement.

Such air valve arrangements are sufficiently known in the art. They are used in motor vehicles to open and close air passage openings as desired, in order to effect convective cooling of units located downstream of the air passage opening in the flow direction as required and in order to reduce the $c_w$ value of the motor vehicle by closing the air passage opening.

Such air valves are generally provided in inflow surfaces of the vehicle, against which the wind blasts when the vehicle is travelling in a straight line, in terms of a system of coordinates moved together with the vehicle. Normally, the air valve arrangements are driven to move by electrical actuators as drives.

However, problems may arise when the actuator fails, for whatever reason, such that adjustment of the air valve from the current position to a desired position different therefrom by the actuator is no longer possible.

This is particularly serious if the air valve is in the shut-off position, in which no or hardly any air flows through the air passage openings but cooling of the units located downstream of the air passage opening requires markedly greater air flow. In such a case, the cooling requirements of vehicle units may under certain circumstances no longer be met due to the actuator failure which may also be caused by failure of the energy supply, so leading to overheating and damage to said units.

The object of the present invention is therefore to provide technical teaching with which a situation may be brought about, even in the event of failure of the drive adjusting the air valve, which prevents or at least reduces the risk of impairment of or damage to units located downstream of the air passage opening in the flow direction.

Said object is achieved according to the invention by an air valve arrangement of the above-mentioned type, in which the air valve is coupled to a preloading device, which preloads the air valve in a direction of relative rotation.

By preloading the air valve in one direction of relative rotation, it is possible to ensure that if the actuator fails, the preloading device adjusts the air valve in the direction of relative rotation in which the preloading force acts.

This does, however, conversely mean that the actuator, in comparison with an air valve not preloaded according to the invention, constantly acts in one adjusting direction against the preloading force of the preloading device and thus has permanently to provide a torque which acts in a desired air valve position on the air valve to hold it in the relevant position against the preloading force likewise acting thereon of the preloading device. However, the energy input necessary therefore is low, compared with the risk of damage eliminated or reduced thereby.

Since the maximum consequential damage caused by a no longer adjustable air valve is presumably overheating of units located downstream of the air passage opening in the air flow direction, the preloading device is preferably provided in such a manner that it preloads the air valve towards the passage position. It may then be ensured that the air valve is always adjusted by the preloading device at least towards the passage position on failure of the drive or actuator adjusting it, such that, even in the event of failure of the drive when an air valve is located in the shut-off position, a minimum air flow to the units requiring cooling located downstream of the air passage opening may be ensured. On the other hand, the $c_w$ value is impaired relative to the air valve arrangement in the shut-off position, but this is negligible when weighing up the respective disadvantageous consequences.

Since adjustment of the air valve is all the more important in the event of failure of the actuator, the closer it is to its shut-off position, it is additionally advantageous for the preloading effect of the preloading device on the air valve to increase with an increasing distance from the passage position. This may be achieved for example by a Hooke's spring, which is coupled to the air valve in such a way that it is increasingly deflected towards the shut-off position as the distance of the air valve from the passage position increases, i.e. is stretched or compressed or twisted, depending on whether it is a tension spring or a compression spring or a torsion spring.

The preloading device may in principle be arranged at any desired location, provided merely that it is capable of exerting torque on the air valve. Unnecessary extension of the air valve arrangement and thus an undesired demand for extra structural space may be prevented by providing the preloading device in the torque transmission path between drive and air valve.

Furthermore, air valves may preferably be of light construction due to the preferred arrangement of the preloading device mentioned herein, since they do not risk being twisted by the torque between actuator and preloading device, which may be the case if preloading device and actuator act on respectively opposing longitudinal ends of the air valve.

In structural terms, the preloading device may be configured in a simple, effective and therefore preferred exemplary embodiment in such a way that the preloading device comprises an at least two-part housing, with a first housing part non-rotatable relative to the frame and with a second housing part non-rotatable relative to the air valve. The two stated housing parts are preferably sealed relative to one another, in order to prevent fluid from penetrating into the housing.

Since the air valve is rotatable relative to the frame, the first and second housing parts are also rotatable relative to one another in the above-stated preferred case.

In principle, it may be conceivable to construct the stated housing parts in one piece with the associated component composed of frame and air valve. Instead of one-piece construction, a joint which is non-detachable under operational conditions, for instance a welded joint, may be conceivable, which, like one-piece construction, simplifies torque transmission.

On the other hand, however, such preloading devices have limited reparability and retrofittability. Provision is therefore preferably made for the second housing part to be connected detachably to the air valve for common relative movement about the axis of relative movement, preferably by a polygonal geometry around the axis of relative movement. For example, the second housing part may comprise a projection or a recess which is bordered in a section in a section plane orthogonal to the axis of relative movement by a polyline. The air valve may likewise comprise a recess or a projection, with an edge which is matched to the edge of the polygonal geometry of the second housing part, preferably is complementary thereto.

Since it is simpler from a manufacturing standpoint to provide the air valve with a projection protruding in the direction of the axis of relative movement, the second housing part preferably comprises a recess bordered by a polyline, with which the second housing part may be mounted on a projection of the air valve for torque transmission.

Feasible polygonal geometries include tri-, tetra-, penta- or hexahedral geometries or in general polygonal geometries.

The first housing part may be clipped onto the frame in a manner known per se. Nonetheless, bonded or other fastening of the first housing part to the frame cannot be ruled out of the present invention.

It is additionally advantageous both for the functionality and for the above-stated advantageous leakproof nature of the housing of the preloading device for the first and second housing parts to be secured against axial displacement relative to one another along the axis of relative movement, for instance by an interlocking bayonet connection. This may preferably be achieved by an interlocking bayonet connection in which the first and second housing parts are initially brought close together and then, by relative rotation about the axis of relative movement, secured in the resultant relative axial position. In this case the latter rotational bayonet movement about the axis of relative movement should proceed in the preloading direction, such that the preloading force from the preloading device acting on the air valve may additionally secure against undoing of the interlocking bayonet connection.

To provide the above-mentioned preloading force provision may be made for the first and second housing parts to be coupled together in a torque-transmitting manner via a preloading means, for instance a preloading spring. To this end, a preloading means, for instance the stated preloading spring, may be supported at one end on the one housing part and at the other end on the in each case other housing part, such that relative movement of the two housing parts relative to one another leads to deformation of the preloading means and consequently to a preloading effect.

In principle, the torque from the driving actuator may conceivably be transmitted via the housing of the preloading means to the air valve. However, this may lead to undesired delays in movement, since the air valve is then coupled resiliently to the drive. For instance, in the less preferable case stated here, the air valve may change its position due to external effects despite an unchanged drive position. To be able to avoid this and ensure a direct association between the position of the drive and the position of the air valve, the air valve may be connected directly to an output shaft extending from the drive, i.e. from the actuator. This connection of the air valve is preferably detachable to facilitate maintenance and repair. The air valve may in particular be plugably connected to the drive for torque transmission by an above-stated polygonal geometry. Apart from negligible deformation caused by material resilience, adjustment of a drive part of the drive likewise mobile relative to the frame then corresponds substantially 1:1 to an adjustment of the air valve. Nevertheless, the preloading force exerted by the preloading device, for instance the above-stated at least two-part housing and the preloading means provided therein, counteracts adjustment of the air valve by the drive in a direction of relative rotation.

It is merely necessary to ensure, and this applies to the entire present invention, that the preloading force originating from the preloading device is greater than an adjustment resistance of the output shaft of the failing drive. This does however always presuppose failure which is not initiated by mechanical blocking of the drive movement in the drive, but instead assumes cases of failure of the drive in which the latter is not blocked or jammed mechanically by broken-off parts or parts which have penetrated into the drive from outside.

To simplify fitting and retrofitting of an air valve arrangement with the preloading device discussed herein, provision may be made for the output shaft to pass through at least the first, preferably also the second housing part. To simplify mounting of the preloading means, the output shaft may pass at least partially through the preloading means, such that the preloading means may be fixed at least partially to the output shaft which surrounds it. Preferably, the output shaft passes completely through the preloading means, such that the preloading means may be pushed onto the output shaft. To this end, a preloading means may be of at least partially helical construction, in the form of a preloading spring. This results on the one hand in a very compact design of the preloading means and results on the other hand in a design which may be easily secured by the output shaft.

The above-stated drive or actuator preferably comprises a motor, an electric motor which is compact and particularly readily installed in the vehicle and easy to supply with energy being particularly feasible here.

The output shaft of the electric motor is preferably coupled directly to the air valve in a torque-transmitting manner. If necessary, however, a transmission may be provided between the motor and the air valve, which transmission converts rotational speed and torque between motor and air valve in accordance with a conversion ratio predetermined by the transmission type.

The present invention is explained in greater detail below with reference to the attached drawings, in which FIG. 1 is a plan view of an embodiment according to the invention of an air valve arrangement and FIG. 2 is a plan view in partial section of the preloading device and the drive of the air valve arrangement of FIG. 1.

In FIG. 1, an embodiment according to the invention of an air valve arrangement is designated overall as 1⊙.

This comprises a frame 12 fixed to the vehicle in the fully assembled state, on which frame 12 a plurality of air valves may be arranged about an axis R of relative rotation.

By way of example, the air valve 14 will be described hereinafter which is coupled via a preloading device 16 described in more detail below with a drive 18 for adjusting the air valve 14 relative to the frame about the axis R of relative rotation.

In the Figures of the present application described herein, the air valve 14 is shown in the shut-off position, in which it maximally reduces the passage opening area of an air passage opening 2⊙ of the frame 12.

The air valves of the air valve arrangement 1⊙ of FIGS. 1 and 2 are preferably coupled together for common movement via a transmission, such that the introduction of a torque into one of the air valves, here into the air valve 14, is sufficient for common adjustment of the coupled air valves relative to the frame 12.

The drive 18 is preferably an electromotive drive.

The frame 12 may comprise a second air passage opening 22, which, as shown in the example of FIG. 1, may be provided with a further four air valves 24, which may modify the passage opening area of the air passage opening 22 by relative rotation relative to the frame 22. The air valves 24 are also shown in their shut-off position in FIG. 1.

In the example shown, the preferably electromotively driven drive 18 is arranged immovably relative to the frame 12 and comprises an output shaft 26, which is rotatable relative to the frame 12, and via which a torque may be introduced into the air valve 14 for rotation about the axis R of relative rotation. As mentioned above, this air valve 14 may be adjusted synchronously with the other air valves by suitable coupling of the air valve 14 with the other air valves parallel thereto through the introduction of the torque into the air valve 14.

FIG. 2 shows the coupling of the air valve 14 to the drive via the preloading device 16 in an enlarged scale.

The output shaft 26 of the drive 18 preferably exhibits a prismatic shape at its free longitudinal end remote from the drive housing, which shape may be bordered by a polyline in a section plane orthogonal to the axis R of relative rotation, here for example by a rectangle, such that the prismatic longitudinal end portion 28 of the output shaft 26 may be of cuboidal construction in the present example. However, the shape of the output shaft is not limited to a cuboid, but rather any desired prisms suitable for torque transmission are conceivable.

The prismatic longitudinal end portion 28 of the output shaft 26 may additionally comprise a coupling recess 3⊙ projecting from the free end 28a into the prismatic longitudinal end portion 28 of the output shaft 26, into which recess 3⊙ a coupling projection 32 of the air valve 14 is inserted for torque transmission.

To this end, the coupling recess 3⊙ and the coupling projection 32 may be of complementary construction, such that the coupling projection 32 rests along the portion projecting into the coupling recess 3⊙ over as large an area as possible against the internal wall of the coupling recess 3⊙. In turn, for advantageous torque transmission both the coupling projection 32 may be of prismatic configuration and the coupling recess 3⊙ may be of, preferably complementary, hollow-prismatic construction.

The coupling projection 32 is preferably provided concentrically to the axis R of relative rotation of the air valve 14 and is particularly preferably connected in one piece or at least nondetachably, under operational conditions, with the air valve 14.

Through the interlocking coupling of output shaft 26 and air valve 14 via the prismatic longitudinal end portion 28 of the output shaft 26 and the coupling projection 32 of the air valve 14, torque may be introduced from the drive 18 directly into the air valve 14.

The preloading device 16 provided preferably between drive 18 and air valve 14 in the torque transmission path from drive 18 to air valve 14 particularly preferably comprises a housing 34, which may be constructed in a plurality of parts, in particular two parts, in order to achieve the objects intended for it.

For instance, the housing 34 of the preloading device 16 may comprise a first housing part 36, which is fixed to the frame 12, preferably immovably relative thereto. This may be effected by fixing projections 38, which may be arranged extending through the frame 12 in appropriate openings 4⊙. The fixing projections 38 may also take the form of clips engaging behind the openings 4⊙ in the frame 12, in order to improve axial fixing of the first housing part 36 to the frame 12.

In addition, the housing 34 of the preloading device 16 may comprise a second housing part 42, which is preferably formed by means of interlocking engagement of a recess 44 of the second housing part 42 with the prismatic longitudinal end portion 28 of the output shaft 26 and/or with a, preferably likewise prismatic, base 46 of the coupling projection 32 for torque transmission with the output shaft 26 or the air valve 14.

This means that the output shaft 26 with its prismatic longitudinal end region 28 is rotatable relative to the first housing part 36, while the second housing part 42 of the housing 34 of the preloading device 16 is coupled for common movement to the output shaft 26 and/or the air valve 14.

In the interior 48 of the housing 34 of the preloading device 16, a preloading means 5⊙ is preferably provided which is particularly preferably constructed as a helical spring, which is passed through in space-saving manner by the output shaft 26, or more precisely its prismatic longitudinal end portion 28 and may be held in position therewith. The preloading means 5⊙ is supported with its longitudinal end 5⊙a closer to the air valve against the second housing part 42 and is supported with its longitudinal end 5⊙b closer to the drive against the first housing part 36, such that, in the event of relative rotation of the two housing parts 36 and 42 relative to one another about the axis R of relative rotation, deformation of the preloading means 5⊙ and thus a restoring preloading action occurs.

The preloading means 5⊙ is preferably installed in such a way that the preloading action increases from the passage position of the air valve 14 not shown in FIGS. 1 and 2, in which the passage opening 2⊙ comprises the largest possible passage opening area, to the illustrated shut-off position.

In addition, the preloading means 5⊙ is selected such that the preloading action exerted therewith on the air valve 14 at least in a region, close to the shut-off position and containing the latter, of the possible positions of the air valve 14 is greater than an adjusting resistance of the de-energised drive 18.

If the air valve 14 is then adjusted with the drive 18, via the output shaft 26, the coupling recess 3⊙ thereof and the coupling projection 32 projecting thereinto, from a passage position not shown in FIG. 2 by approx. 9⊙° into the shut-off position illustrated in FIG. 2, the preloading means 5⊙ is loaded increasingly as the adjustment increases, such that the drive 18 has permanently to provide a torque which counteracts the preloading action originating from the preloading means 5⊙, in order to be able to maintain the air valve 14 in a position other than the passage position once the former position has been reached.

If, in so doing, the drive 18 fails, be it due to a defect in the drive, or due to a defect in the energy supply, then the drive 18 is no longer capable of providing a torque which counteracts the preloading action of the preloading means 5⊙, such that the preloading means 5⊙, supported against the first housing part 36 fixed to the frame, returns the second housing part 42 fixed to the air valve together with the output shaft 26, coupled thereto, of the drive 18 into the passage position or at least moves it towards this position, such that when a vehicle is moving air flows through the air passage opening 2⊙.

As can be seen from FIG. 1, the housing parts 36 and 42 of the housing 34 of the preloading device 16 may be secured relative to one another against axial movement. This may be brought about for example by an interlocking bayonet connection. To this end, one of the two housing parts, in the present example the second housing part 42, may comprise a recess 52 with an axial recess portion, which extends blind from the edge of the housing axially into the circumferential surface of the respective housing 42, and with a recess portion extending in the circumferential direction, which recess portion extends blind from the longitudinal end of the axial recess portion remote from the edge in the circumferential direction along the circumferential surface of the respective housing part.

A projection 54 provided on the respective other housing part, in the present example on the first housing part 36, may project in this recess 52.

On fitting, the projection 54 is firstly introduced axially from the edge of the housing part 42 bearing the recess 52 until the part of the recess 52 extending circumferentially is reached and then in the circumferential direction by relative rotation of the two housing parts 36 and 42. The selected interlocking bayonet connection ensures relative rotatability of the air valve 14 coupled to the second housing 42 relative to the housing part 36 fixed to the frame, whilst preventing axial mobility at least of the two housing parts 36 and 42 relative to one another.

In the shut-off position shown in FIGS. 1 and 2, the preloading force which preloads towards the passage position not shown, said force originating from the preloading means 5☉, has a maximum.

As can be seen in particular from FIG. 2, the first housing part 36 may be placed onto the output shaft 26 and the second housing part 42 may be placeable for common movement with the air valve 14 and/or with the output shaft 26 onto the output shaft 26 or onto a component connected fixedly to the air valve 14, for instance onto the base 46 of the coupling projection 38. The preloading device 16 is thus easy to fit and may also be simply retrofitted to existing air valve arrangements.

The invention claimed is:

1. An air valve arrangement for a motor vehicle, comprising:
    a frame comprising an air passage opening having a passage opening area;
    an air valve provided on said frame so as to be rotatable thereto about an axis in opposing directions of relative rotation, provided in such a way on the frame that it is rotatable between a shut-off position and a passage position, the air valve in the shut-off position reducing the passage opening area of the air passage opening from in the passage position; and
    a drive, which is designed to drive the air valve in at least one first direction of the relative rotation about the axis;
    wherein the air valve is coupled to a preloading device, which preloads the air valve toward the passage position in a direction of relative rotation;
    wherein the preloading device comprises an at least two-part housing, with a first housing part non-rotatable relative to the frame and with a second housing part non-rotatable relative to the air valve;
    wherein a preloading means is accommodated in the interior of the housing;
    wherein the first and the second housing parts are coupled to one another in a torque-transmitting manner via the preloading means.

2. An air valve arrangement according to claim 1, wherein the preloading device is provided in the torque transmission path between drive and air valve.

3. An air valve arrangement according to claim 1, wherein the second housing part is connected detachably to the air valve for common relative movement about the axis.

4. An air valve arrangement according to claim 1, wherein the first and second housing parts are secured against axial displacement relative to one another along the axis.

5. An air valve arrangement according to claim 1, Wherein the first and the second housing parts are coupled to one another via a preloading spring.

6. An air valve arrangement according to claim 5, wherein the preloading spring is supported at one end on the first housing part and at the other end on the second housing part.

7. An air valve arrangement according to claim 1, wherein the air valve is directly connected to an output shaft, which extends from the drive.

8. An air valve arrangement according to claim 1, wherein the air valve is directly connected to an output shaft which extends from the drive, wherein the output shaft passes through at least the first housing part.

9. An air valve arrangement according to claim 5, wherein the air valve is directly connected to an output shaft which extends from the drive, wherein the output shaft passes through at least the first housing part, and passes at least partially through the preloading-spring.

10. An air valve arrangement according to claim 1, wherein the drive comprises a motor and a transmission being provided between motor and air valve.

11. An air valve arrangement according to claim 1, wherein the preloading device preloads the air valve towards the passage position with a preloading action which increases as the distance from the passage position increases.

12. The air valve arrangement according to claim 1, wherein the two housing parts of the two-part housing are sealed relative to one another, in order to prevent fluid from penetrating into the two-part housing.

13. The air valve arrangement according to claim 3, wherein the second housing part is connected to the air valve by a polygonal geometry surrounding the axis.

14. The air valve arrangement according to claim 4, wherein the first and second housing parts are secured by an interlocking bayonet connection.

15. The air valve arrangement according to claim 7, wherein the air valve is detachably connected to the output shaft.

16. The air valve arrangement according to claim 8, wherein the output shaft passes also through the second housing part.

17. The air valve arrangement according to claim 9, wherein the preloading spring is helical at least in places.

* * * * *